United States Patent
Hsieh et al.

(10) Patent No.: US 11,042,070 B2
(45) Date of Patent: Jun. 22, 2021

(54) COVER PLATE STRUCTURE AND DISPLAY APPARATUS

(71) Applicant: E Ink Holdings Inc., Hsinchu (TW)

(72) Inventors: Yun-Nan Hsieh, Hsinchu (TW); Chih-Cheng Ko, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 16/884,068

(22) Filed: May 27, 2020

(65) Prior Publication Data

US 2020/0387042 A1    Dec. 10, 2020

(30) Foreign Application Priority Data

Jun. 5, 2019  (TW) .................................. 108119563

(51) Int. Cl.
| | | |
|---|---|---|
| *G02F 1/16753* | (2019.01) | |
| *F21V 8/00* | (2006.01) | |
| *G02F 1/16756* | (2019.01) | |
| *G02F 1/1677* | (2019.01) | |
| *G02F 1/167* | (2019.01) | |

(52) U.S. Cl.
CPC ......... *G02F 1/16753* (2019.01); *G02B 6/005* (2013.01); *G02F 1/1677* (2019.01); *G02F 1/16756* (2019.01); *G02F 1/167* (2013.01)

(58) Field of Classification Search
CPC ............ G02F 1/16753; G02F 1/16756; G02F 1/1677; G02F 1/167; G02B 6/005
See application file for complete search history.

(56) References Cited

U.S. PATENT DOCUMENTS

| | | |
|---|---|---|
| 5,963,280 A | 10/1999 | Okuda et al. |
| 6,144,424 A | 11/2000 | Okuda et al. |
| 7,973,880 B2 | 7/2011 | Sumida et al. |
| 9,010,979 B2 | 4/2015 | Lin et al. |
| 9,116,343 B2 | 8/2015 | Yun et al. |
| 9,910,208 B2 | 3/2018 | Bang et al. |
| 9,927,650 B1 * | 3/2018 | Almanza-Workman ..................... G02F 1/1677 |
| 9,958,596 B2 | 5/2018 | Tai et al. |
| 2018/0252862 A1 * | 9/2018 | Shei ........ G06F 3/0412 |

FOREIGN PATENT DOCUMENTS

| | | | |
|---|---|---|---|
| JP | WO-2013168506 A1 * | 11/2013 | ............ G02B 6/005 |
| TW | 201541299 * | 11/2015 | ........... G02F 1/1333 |
| TW | 201541299 A | 11/2015 | |
| TW | 201546670 A | 12/2015 | |
| TW | 201602704 A | 1/2016 | |
| TW | 201833883 A | 9/2018 | |

OTHER PUBLICATIONS

Corresponding Taiwan office action dated Apr. 17, 2020.

* cited by examiner

*Primary Examiner* — Donald L Raleigh
(74) *Attorney, Agent, or Firm* — CKC Partners Co., LLC

(57) ABSTRACT

A cover plate structure includes a first light transmitting layer, a second light transmitting layer, and a light shielding layer. The first light transmitting layer includes a top surface and a bottom surface opposite the top surface. The second light transmitting layer is on the top surface of the first light transmitting layer. A refractive index of the first light transmitting layer is greater than a refractive index of the second light transmitting layer. The light shielding layer is on the bottom surface of the first light transmitting layer.

9 Claims, 6 Drawing Sheets

COVER PLATE STRUCTURE AND DISPLAY APPARATUS

CROSS-REFERENCE TO RELATED APPLICATION

This application claims priority to Taiwan Application Serial Number 108119563, filed Jun. 5, 2019, which is herein incorporated by reference in its entirety.

BACKGROUND

Field of Invention

The present invention relates to a cover plate structure and a display apparatus.

Description of Related Art

In the modern consumer electronics market nowadays, portable electronic apparatuses widely use electrophoretic display devices to serve as display screens, for example, an e-book. A display medium layer (or electronic ink) of the electrophoretic display device may be composed of white particles and black particles blended in an electrophoresis. By applying a voltage on the display medium layer, the white particles and the black particles are driven to move so as to allow pixels to display black, white or grey scale. To enhance a display quality, a front-light module can be incorporated in the electrophoretic display device.

Generally speaking, the front-light module includes a light source, a light guide plate, and a cover plate having a printed ink layer. The light guide plate and the cover plate are adhered by an optical adhesive. However, when light passes from the light guide plate into the cover plate, a portion of the light may pass to a side of the cover plate or the optical adhesive, resulting in a problem of light leakage.

SUMMARY

The embodiments of the present disclosure provide a cover plate structure and a display apparatus. By a configuration of a first light transmitting layer having a refractive index greater than a refractive index of a second light transmitting layer and greater than a refractive index of the optical adhesive layer, total internal reflection can occur at an interface between the first light transmitting layer and the second light transmitting layer and at an interface between the first light transmitting layer and an optical adhesive layer. Furthermore, by thinning the first light transmitting layer, the light undergone total internal reflection can pass to the non-display region on two sides of the display apparatus and gives an increased possibility of being absorbed by the light shielding layer. In this way, a light leakage from side surfaces of the display apparatus is reduced.

In some embodiments, a cover plate structure includes a first light transmitting layer, a second light transmitting layer, and a light shielding layer. The first light transmitting layer has a top surface and a bottom surface opposite the top surface. The second light transmitting layer is on the top surface of the first light transmitting layer. A refractive index of the first transmitting layer is greater than a refractive index of the second transmitting layer. The light shielding layer is on the bottom surface of the first light transmitting layer.

In some embodiments, a display apparatus includes a light guide plate, an abovementioned cover plate structure on the light guide plate, an optical adhesive layer, and a reflective display. The optical adhesive layer is between the light guide plate and the cover plate structure. The optical adhesive layer adheres the light guide plate to the bottom surface of the first light transmitting layer of the cover plate structure. The light guide plate is between the reflective display and the optical adhesive layer.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
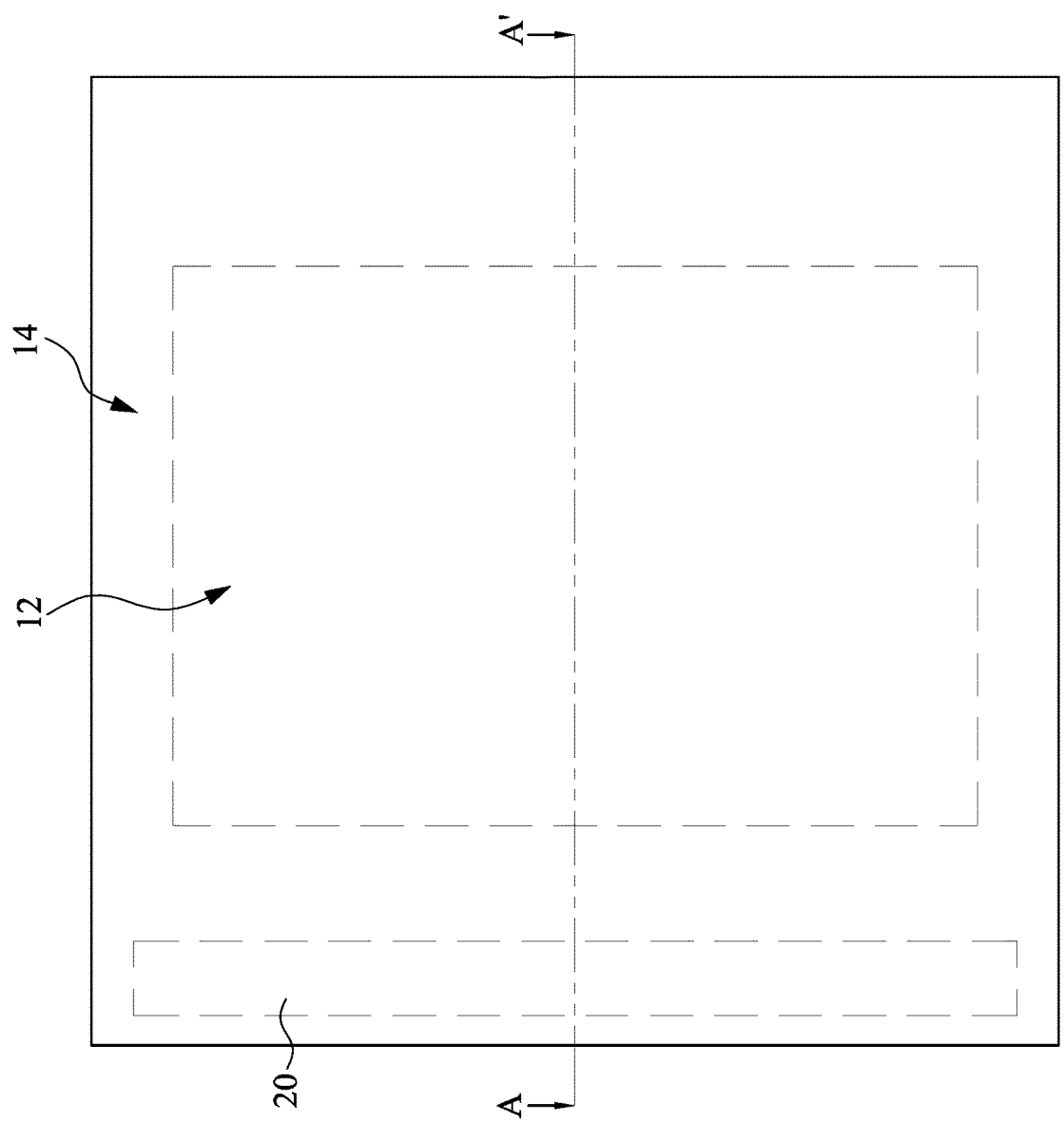
FIG. 1 is a top view of a display apparatus in accordance with some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

Figure 2:
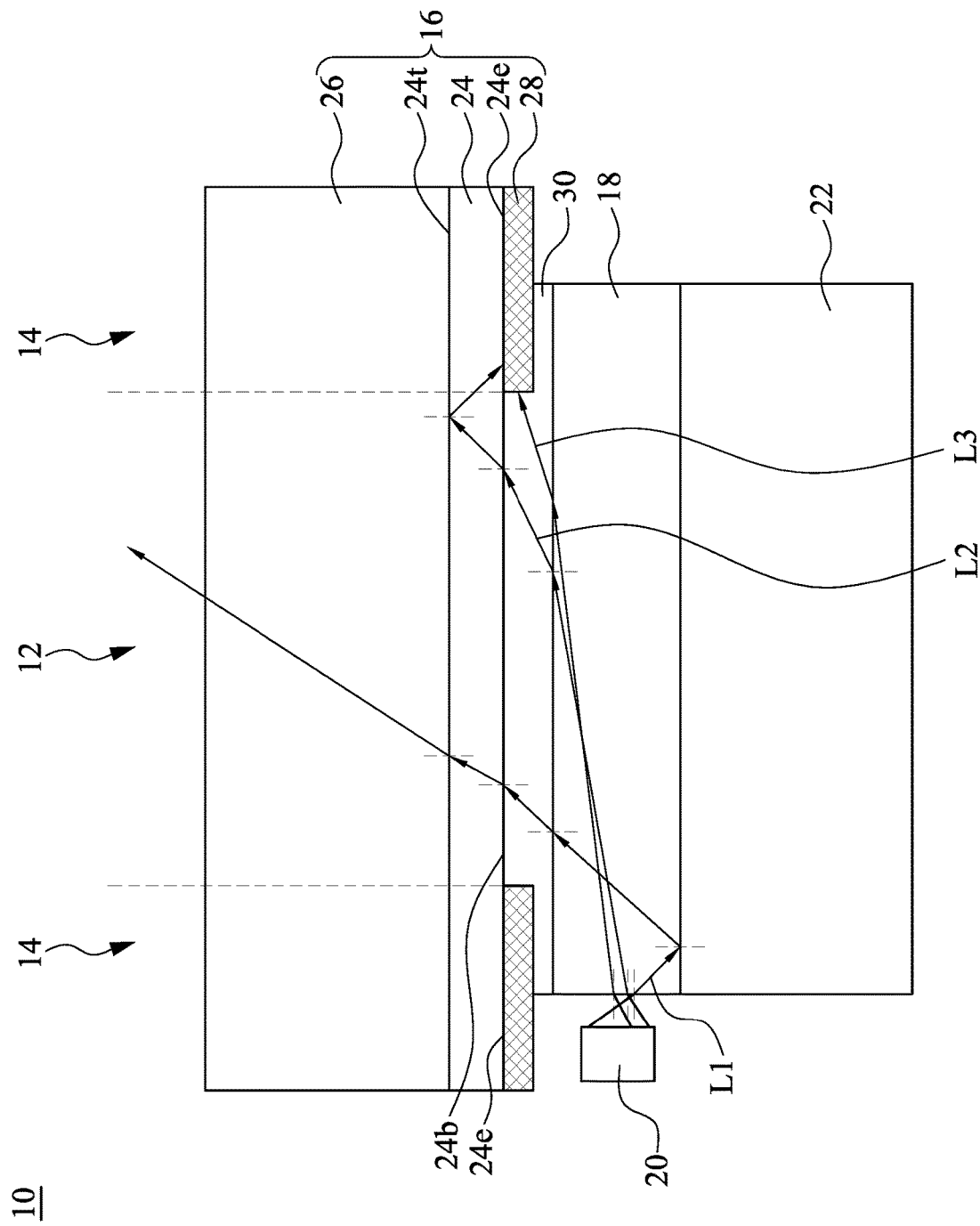
FIG. 2 is a cross-sectional view of the display apparatus of FIG. 1 taken along line A-A'.

FIG. 1 is a top view of a display apparatus 10 in accordance with some embodiments of the present disclosure. FIG. 2 is a cross-sectional view of the display apparatus 10 of FIG. 1 taken along line A-A'. Reference is made to FIGS. 1 and 2. The display apparatus 10 includes a display region 12 and a non-display region 14. The non-display region 14 is adjacent to the display region 12. For example, in some embodiments, the non-display region 14 may surround the display region 12. The display apparatus 10 includes a cover plate structure 16, a light guide plate 18, a light source 20, and a reflective display 22. The light guide plate 18 is between the cover plate structure 16 and the reflective display 22. In some embodiments, the reflective display 22 may be an electrophoretic display. The electrophoretic display may be a single color display of a full color display. The light source 20 is disposed on a side of the light guide plate 18.

The cover plate structure 16 includes a first light transmitting layer 24, a second light transmitting layer 26, and a light shielding layer 28. The first light transmitting layer 24 has a top surface 24*t* and a bottom surface 24*b* opposite the top surface 24*t*. The second light transmitting layer 26 is on the top surface 24*t* of the first light transmitting layer 24. A refractive index of the first light transmitting layer 24 is greater than a refractive index of the second light transmitting layer 26. The display apparatus 10 further includes an optical adhesive layer 30. The optical adhesive layer 30 is between the cover plate structure 16 and the light guide plate 18. In particular, the optical adhesive layer 30 adheres the light guide plate 18 to the bottom surface 24b of the first light transmitting layer 24 of the cover plate structure 16. A refractive index of the optical adhesive layer 30 is less than the refractive index of the first light transmitting layer 24. The light shielding layer 28 is arranged on the non-display region 14. For example, the light shielding layer 28 is on an edge 24e of the bottom surface 24b of the first light transmitting layer 24. A normal projection of the edge 24e of the bottom surface 24b onto the first light transmitting layer 24 overlaps the non-display region 14. The light shielding layer 28 is absent in other regions except for the edge 24e of the bottom surface 24b of the first light transmitting layer 24. The light guide plate 18 is between the reflective display 22 and the optical adhesive layer 30.

In some embodiments, the first light transmitting layer 24 and the second light transmitting layer 26 are formed by extrusion. For example, by using a material of the first light transmitting layer 24 and a material of the second light transmitting layer 26 to perform dual extrusion (coextrusion), the first light transmitting layer 24 and the second light transmitting layer 26 are formed. In some other embodiments, the first light transmitting layer 24 may be formed on the second light transmitting layer 26 by using spin-on coating, spray coating, flow coating, printing, deposition, sputtering, or other suitable methods.

In some embodiments, the light shielding layer 28 is a printed ink layer. Since the first light transmitting layer 24 may serve as a support substrate for supporting the light shielding layer 28, the light shielding layer 28 may be directly formed on the bottom surface 24b of the first light transmitting layer 24 by a general printing method. The printing method may be, for example, spin coating, screen coating, gravure printing, slot die coating, ink jet printing, deposition, spray coating, or sputtering. In some other embodiments, the light shielding layer 28 may be a photoresist layer. Since the first light transmitting layer 24 may serve as the support substrate for supporting the light shielding layer 28. The light shielding layer 28 may be formed on the bottom surface 24b of the first light transmitting layer 24 using methods for forming the photoresist layer. The methods for forming the photoresist layer may include steps of spin-on coating, exposure, and developing.

Lights L1, L2, and L3 provided by the light source 20 pass into the light guide plate 18 through a side surface of the light guide plate 18. For example, the light L1 passes from a bottom surface of the light guide plate 18 into the reflective display 22, is then reflected by the reflective display 22, and then passes through the light guide plate 18, the optical adhesive layer 30, the first light transmitting layer 24, and the second light transmitting layer 26 to transfer an image of the reflective display 22 to a viewer. In some embodiments, the light source 20 can be in direct contact with or non-indirect contact with the side surface of the light guide plate 18. When ambient light (not shown) illuminates the reflective display 22, the reflective display 22 may reflect the ambient light. A path of the reflected ambient light is similar to a path of the light L1.

The light L2 passes into the light guide plate 18 through the side surface of the light guide plate 18 and then passes into the optical adhesive layer 30 through the top surface of the light guide plate 18. Since the reflective index of the first light transmitting layer 24 is greater than the reflective index of the second light transmitting layer 26 and is greater than the refractive index of the optical adhesive layer 30, the light L2 is controlled to undergo total internal reflection at an interface between the first light transmitting layer 24 and the second light transmitting layer 26 and at an interface between the first light transmitting layer 24 and the optical adhesive layer 30. The light L2 undergone the total internal reflection passes in a direction toward the non-display region 14 on sides of the display apparatus 10 and hence is absorbed by the light shielding layer 28. In this way, a light leakage from side surfaces of the first light transmitting layer 24 is reduced. In particular, about 25% to 35% of the light leakage from side surfaces of the display apparatus 10 is reduced.

A thickness of the first light transmitting layer 24 is less than a thickness of the second light transmitting layer 26. In some embodiments, the thickness of the first light transmitting layer 24 is less than or equal to 10% of a total thickness of the first light transmitting layer 24 and the second light transmitting layer 26. In this way, by thinning the first light transmitting layer 24, the light L2 undergone the total internal reflection in the first light transmitting layer 24 and the light L3 pass in a direction toward the non-display region 14 on sides of the display apparatus 10 are more easily to be absorbed by the light shielding layer 28. Therefore, a problem of the light leakage from the side surface of the display apparatus 10 is effectively solved. In particular, about 25% to 35% of the light leakage from side surfaces of the display apparatus 10 is reduced.

The first light transmitting layer 24 and the second light transmitting layer 26 may be glass substrate, ceramic substrate, or plastic substrate. For example, the first light transmitting layer 24 and the second light transmitting layer 26 may include glass, polymethylmethacrylate (PMMA), polycarbonate (PC), polyethylene terephthalate (PET), cyclo-olefin polymers (COP), cyclic olefin copolymer (COC), polyethylene (PE), polyetheretherketone (PEEK), polyethylene naphthalate (PEN), polyimide (PI), polyetherimide (PEI), or combinations thereof. In some embodiments, the first light transmitting layer 24 may be polycarbonate (PC) and the second light transmitting layer 26 may be polymethylmethacrylate (PMMA) or glass substrate. In another embodiment, the first light transmitting layer 24 may be a high refractive index polycarbonate (PC) and the second light transmitting layer 26 may be a low refractive index polycarbonate (PC).

The optical adhesive layer 30 is optically clear adhesive (OCA) or optically clear resin (OCR). In some embodiments, the optical adhesive layer 30 may include epoxy resin, phenoxy resin, acrylic resin, polyimide resin, Parylene resin, polyurethane resin, polysiloxanes, bismaleimide, or combinations thereof.

Figure 3:
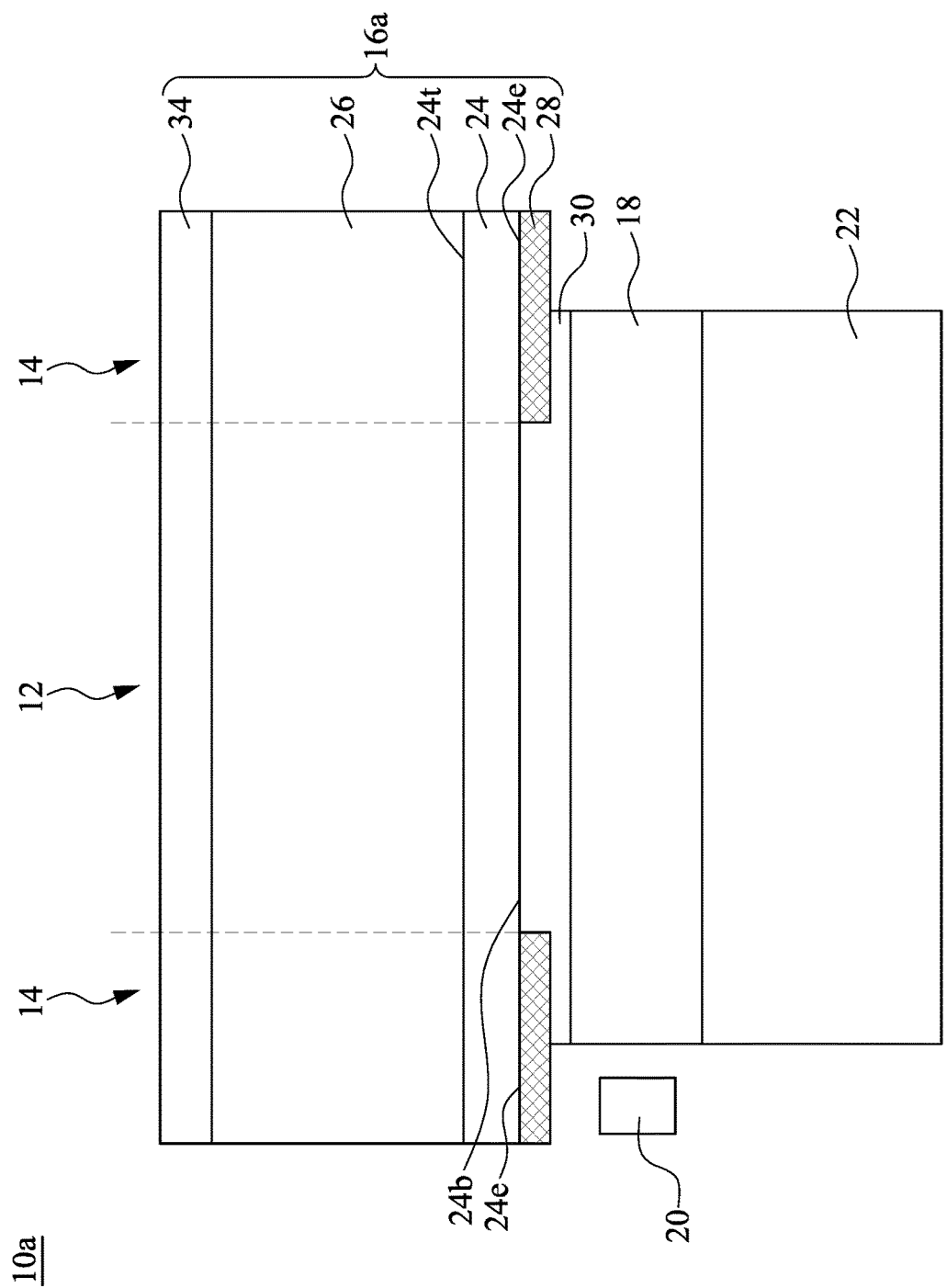
FIG. 3 is a cross-sectional view of a display apparatus in accordance with another embodiment of the present disclosure.

FIG. 3 illustrates a cross-sectional view of a display apparatus 10a according to another embodiment of the present disclosure. A path of the light of the display apparatus 10a is similar to that of the display apparatus 10 and is therefore omitted in the figure. As shown in FIG. 3, a main difference between the present embodiment and the embodiment of FIG. 2 is that: the cover structure 16a of the present embodiment further includes a protective layer 34. The protective layer 34 is over the second light transmitting layer 26. For example, the protective layer 34 includes a hard coating (HC) layer, an anti-glare (AG) layer, or combinations thereof. Generally, a thermosetting mixture or a UV (Ultraviolet) curable mixture is coated on the second light transmitting layer 26 to form the protective layer 34. In other words, the protective layer 34 has adhesive properties and can be adhered onto the second light transmitting layer 26. In such embodiments, the protective layer 34 is a self-adhesive layer formed by a self-adhesive material. The coating method includes, but is not limited to, spin coating, immersion method, spray coating processes, slit coating, bar coating, infiltration methods, roll coating, gravure coating, and mold coating.

Figure 4:
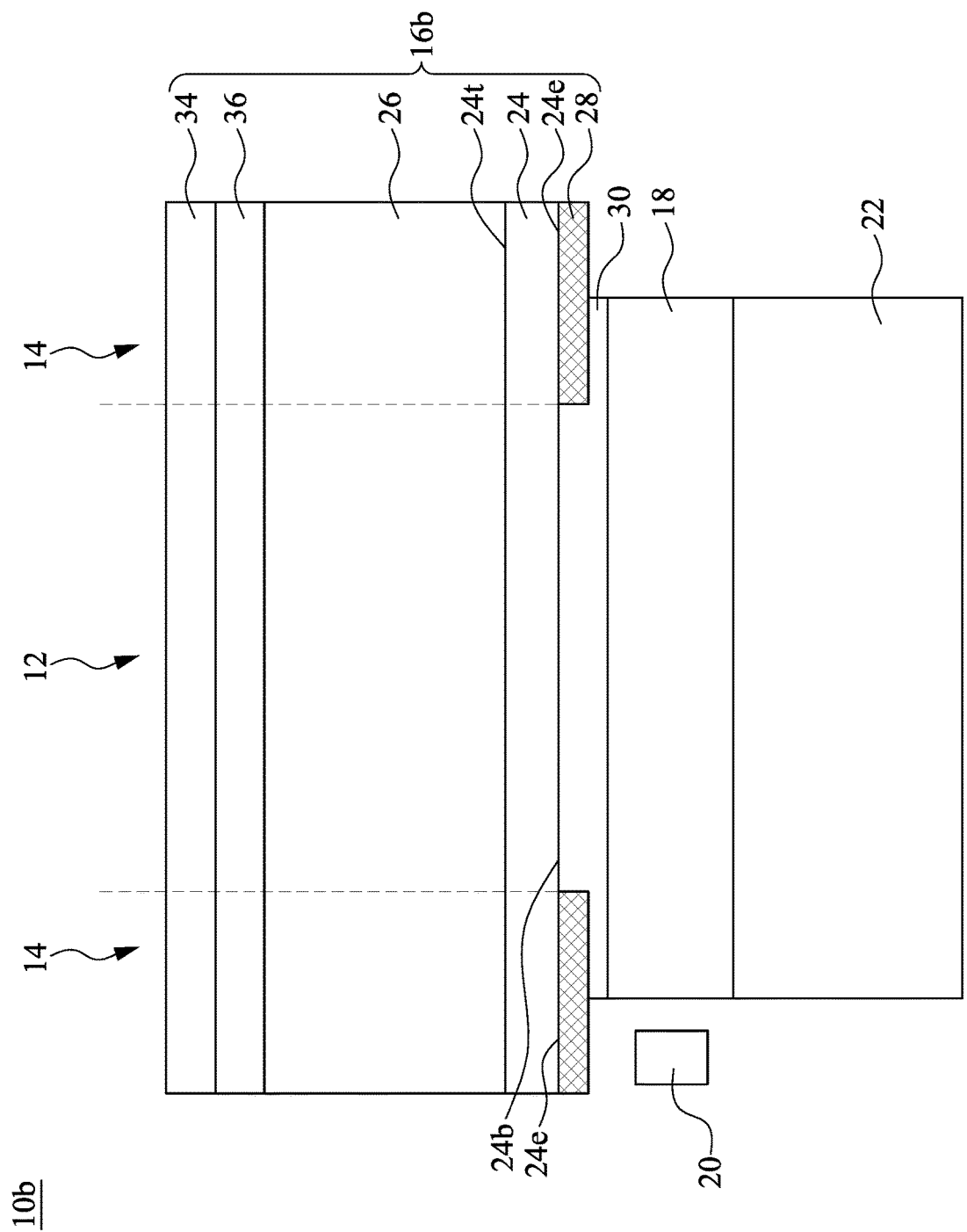
FIG. 4 is a cross-sectional view of a display apparatus in accordance with another embodiment of the present disclosure.

FIG. 4 illustrates a cross-sectional view of a display apparatus 10b according to another embodiment of the present disclosure. A path of the light of the display apparatus 10b is similar to that of the display apparatus 10 and is therefore omitted in the figure. As shown in FIG. 4, a main difference between the present embodiment and the embodiment of FIG. 3 is that: the cover structure 16b of the present embodiment further includes a third light transmitting layer 36. The third light transmitting layer 36 is over a top surface of the second light transmitting layer 26. A material of the third light transmitting layer 36 is different from the material of first light transmitting layer 24 and the material of the second light transmitting layer 26. In some embodiments, the third light transmitting layer 36 includes polymethylmethacrylate (PMMA), the second light transmitting layer 26 includes low refractive index polycarbonate (PC), and the first light transmitting layer 24 includes high refractive index polycarbonate (PC). In another embodiment, the third light transmitting layer 36 includes polymethylmethacrylate (PMMA), the second light transmitting layer 26 includes glass, and the first light transmitting layer 24 includes high refractive index polycarbonate (PC).

A thickness of the third light transmitting layer 36 is less than a thickness of the second light transmitting layer 26. In some embodiments, the thickness of third light transmitting layer 36 is less than or equal to 10% of a total thickness of the first light transmitting layer 24, the second light transmitting layer 26, and the third light transmitting layer 36. In some embodiments, the first light transmitting layer 24 and the second light transmitting layer 26 have different elastic modulus, and the third light transmitting layer 36 and the second light transmitting layer 26 have different elastic modulus as well. Therefore, the first light transmitting layer 24 can apply a stress on a bottom surface of the second light transmitting layer 26. And the third light transmitting layer 36 can apply another stress on a top surface of second light transmitting layer 26. By selecting suitable materials of the first, second, and third light transmitting layers 24, 26, and 36, the stress which the third light transmitting layer 36 applied on the second light transmitting layer 26 and the stress which the first light transmitting layer 24 applied on the second light transmitting layer 26 have opposite directions and substantially the same degree so as to offset stresses on opposite sides of the second light transmitting layer 26. Therefore, a mechanical strength of the cover plate structure 16 is enhanced and a warpage degree of the cover plate structure 16 is reduced.

Figure 5:
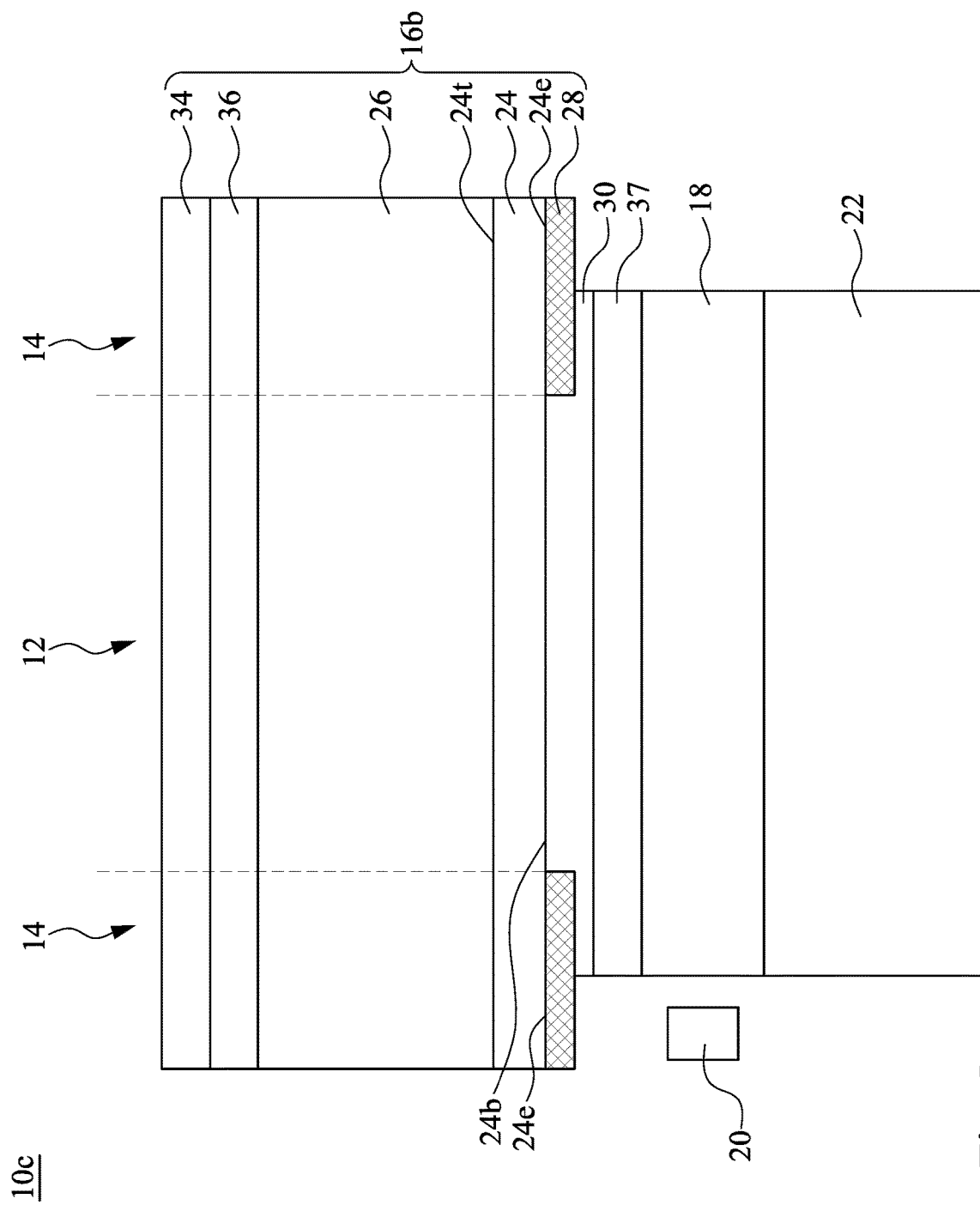
FIG. 5 is a cross-sectional view of a display apparatus in accordance with another embodiment of the present disclosure.
Figure 6:
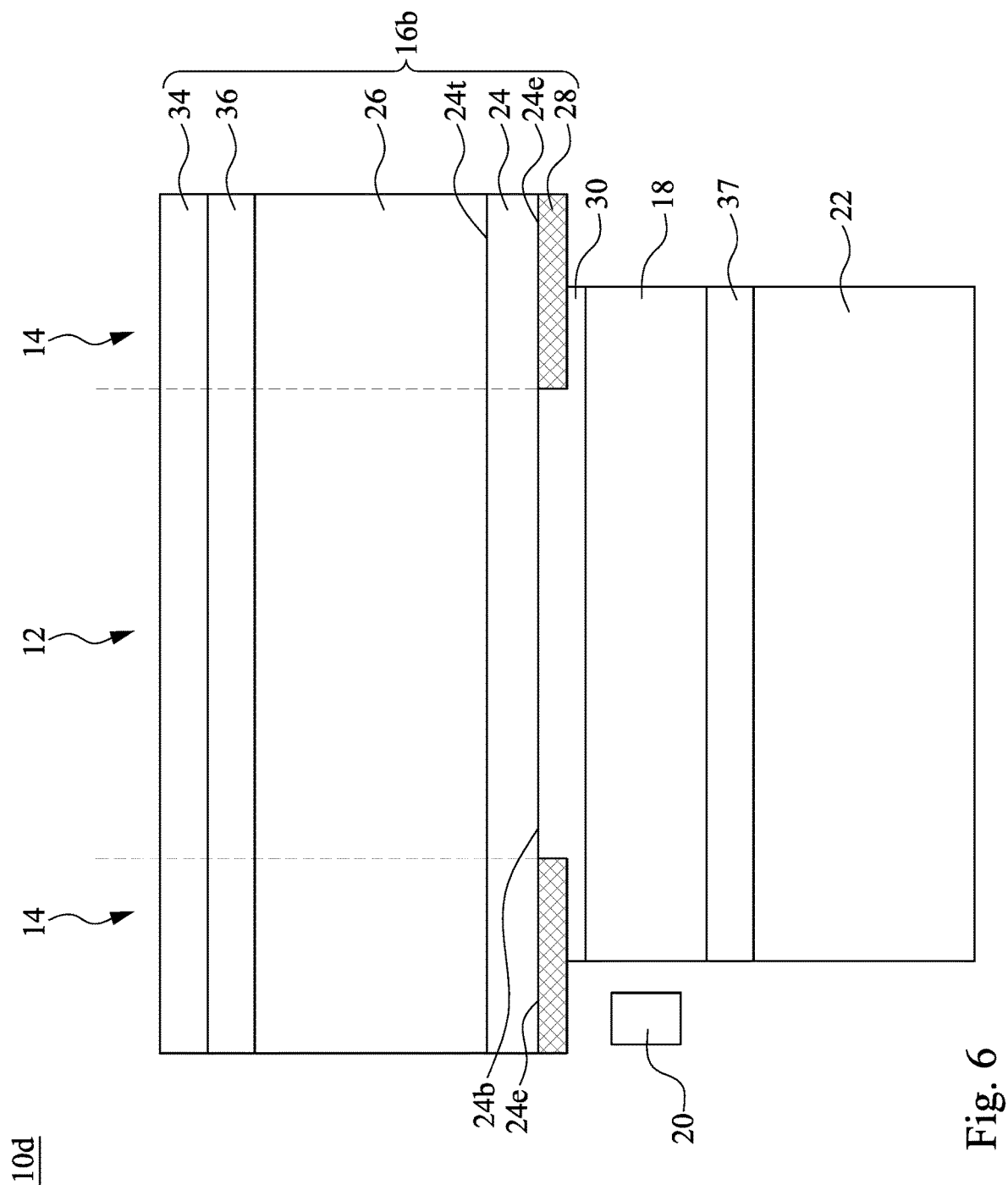
FIG. 6 is a cross-sectional view of a display apparatus in accordance with another embodiment of the present disclosure.

FIG. 5 illustrates a cross-sectional view of a display apparatus 10c according to another embodiment of the present disclosure. A main difference between the present embodiment and the embodiment of FIG. 4 is that: the display apparatus 10c of the present embodiment further includes a touch sensitive layer 37. The touch sensitive layer 37 is between the light guide plate 18 and the optical adhesive layer 30. The touch sensitive layer 37 provides touch function for the display apparatus 10b and may include indium tin oxide (ITO). The touch sensitive layer 37 and the light guide plate 18 may be, for example, adhered by a transparent adhesive layer (not shown). FIG. 6 illustrates a cross-sectional view of a display apparatus 10d according to another embodiment of the present disclosure. A main difference between the present embodiment and the embodiment of FIG. 5 is that: the touch sensitive layer 37 of the present disclosure is between the light guide plate 18 and the reflective display 22. In other embodiments of the present disclosure, other functional devices may be combined over the top or bottom of the light guide plate 18 according to an actual application. The light guide plate 18 and other functional devices may be adhered by a transparent adhesive layer or connected by an air layer.

The embodiments of the present disclosure provide a cover plate structure 16 and a display apparatus 10. By configuring the refractive index of the first light transmitting layer 24 greater than the refractive index of the second light transmitting layer 26 and greater than the refractive index of the optical adhesive layer 30, the light L2 can undergo total internal reflection at an interface between the first light transmitting layer 24 and the second light transmitting layer 26 and at an interface between the first light transmitting layer 24 and the optical adhesive layer 30. Furthermore, by thinning the first light transmitting layer 24, the light L2 undergone the total internal reflection and the light L3 pass in a direction toward the non-display region 14 on sides of the display apparatus 10 are more easily to be absorbed by the light shielding layer 28. In this way, a light leakage from side surfaces of the display apparatus 10 is reduced.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A cover plate structure, comprising:
a first light transmitting layer having a top surface and a bottom surface opposite the top surface;
a second light transmitting layer on the top surface of the first transmitting layer, wherein a refractive index of the first transmitting layer is greater than a refractive index of the second transmitting layer, and a thickness of the first light transmitting layer is less than or equal to 10% of a total thickness of the first light transmitting layer and the second light transmitting layer; and
a light shielding layer on the bottom surface of the first light transmitting layer.

2. The cover plate structure of claim 1, wherein a thickness of the first light transmitting layer is less than a thickness of the second light transmitting layer.

3. The cover plate structure of claim 1, further comprising:
a protective layer on the second light transmitting layer, wherein the protective layer comprises a hard coating layer, an anti-glare layer or combinations thereof; and
a third light transmitting layer between the protective layer and the second light transmitting layer, wherein a material of the third light transmitting layer is different from a material of the first light transmitting layer.

4. The cover plate structure of claim 3, wherein a thickness of the third light transmitting layer is less than a thickness of the second light transmitting layer.

5. The cover plate structure of claim 3, wherein a thickness of the third light transmitting layer is less than or equal to 10% of a total thickness of the first light transmitting layer, the second light transmitting layer, and the third light transmitting layer.

6. A display apparatus, comprising:
- a light guide plate;
- a cover plate structure according to one of claims 1-2 and 3-5 on the light guide plate;
- an optical adhesive layer adhering the light guide plate to the bottom surface of the first light transmitting layer of the cover plate structure;
- a reflective display, wherein the light guide plate is between the reflective display and the optical adhesive layer; and
- a light source disposed adjacent to a side of the light guide plate.

7. The display apparatus of claim 6, wherein a refractive index of the optical adhesive layer is less than the refractive index of the first light transmitting layer.

8. The display apparatus of claim 6, further comprising:
- a touch sensitive layer between the light guide plate and the optical adhesive layer.

9. The display apparatus of claim 6, further comprising:
- a touch sensitive layer between the light guide plate and the reflective display.

* * * * *